Figure 1:
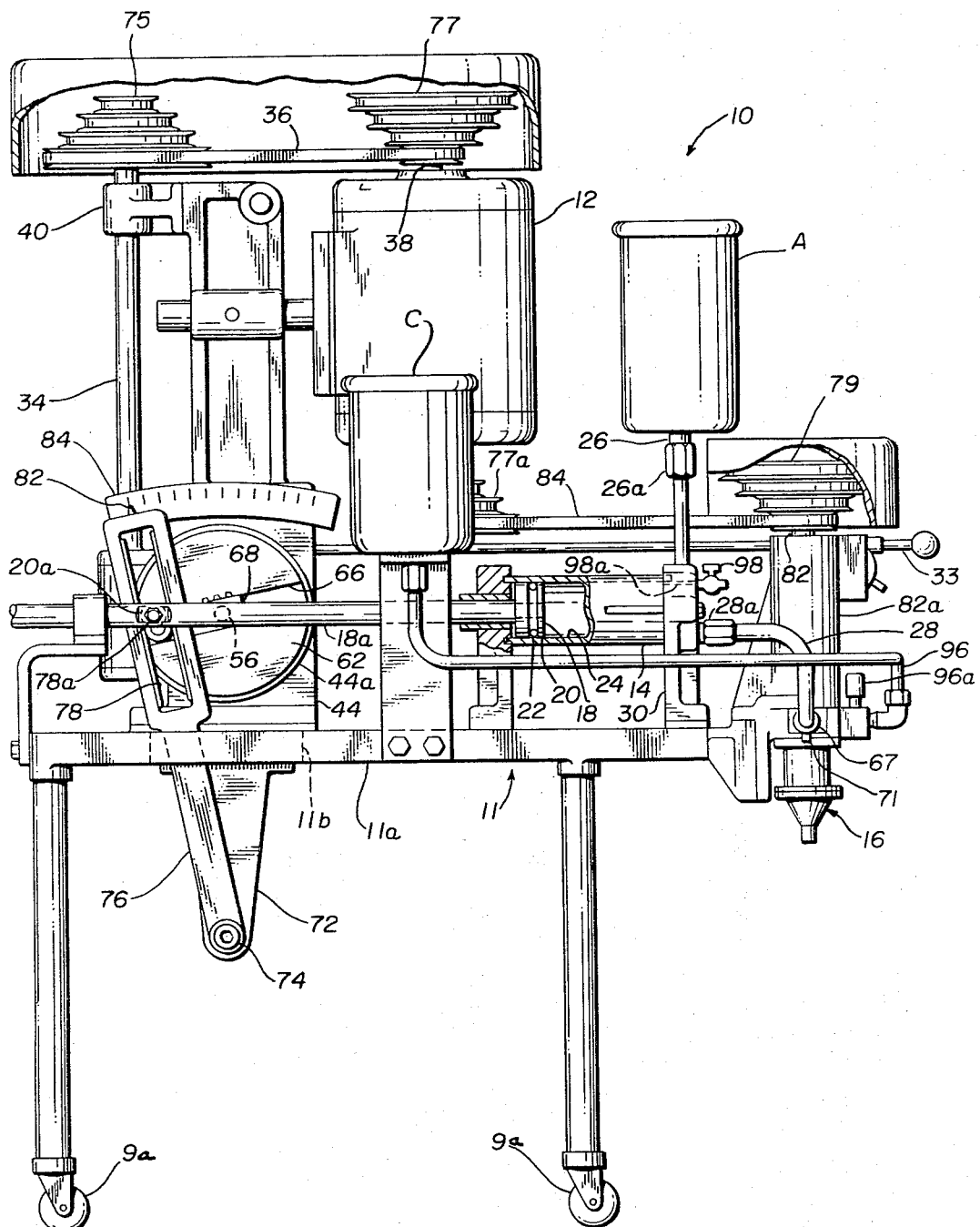

Jan. 10, 1967   M. A. NAPIER   3,297,306
METERING AND MIXING MACHINE
Filed March 1, 1965   5 Sheets-Sheet 1

INVENTOR.
MAURICE A. NAPIER
BY  *Louis Candela*

ATTORNEY

INVENTOR.
MAURICE A. NAPIER

BY Louis Candela

ATTORNEY

INVENTOR.
MAURICE A. NAPIER
BY Louis Candela
ATTORNEY

INVENTOR.
MAURICE A. NAPIER
BY Louis Candela
ATTORNEY

United States Patent Office 3,297,306
Patented Jan. 10, 1967

3,297,306
METERING AND MIXING MACHINE
Maurice A. Napier, 841 Timberline Drive,
Akron, Ohio 44313
Filed Mar. 1, 1965, Ser. No. 436,192
7 Claims. (Cl. 259—8)

This invention refers generally to a machine for measuring and mixing substances for delivery to a mold. More particularly, it refers to a machine for combining chemical substance and/or compounds under circumstances and conditions where measurement must be precise and exact and where mixing must be thorough and uncontaminated.

In chemical research and processing, the mixing of fluids has always been important. Types and amounts of fluids intended to be blended together have been explored with great care so as not to vary the intended result, unless the variance is calculated and brought about by known factors. This particular facet of chemical research has gained in stature in recent years as is witnessed by the innumerable products made of plastic-like or rubber-like materials.

The type of fluids compounded together to obtain a certain product is ever expanding either to result in a new product or improve upon old products. Coincidental to this basic chemical research and perhaps, a stumbling block in some instances, is the problem of delivery to a mold. It is one thing to hand mix known fluidity compounds but quite another to economically manufacture the desired product through use of an appropriate machine.

Efforts have, of course, been directed toward the development of a machine suitable for this purpose. The prior art reveals a variety of machine devices intended to be of assistance in solving this particular problem. However, one obvious disadvantage in the prior art devices seems to be an apparent complication in construction. As a result, the machines are cumbersome and generally must be given space where they can remain stationary. Then, too, as is quite well known, complication in the structure of a machine increases cost, not only in the original instance but also in maintenance. And, also as is well known, the breakdown of machinery means work stoppage and valueless lost time.

Another problem to be encountered by the machines is their adaptability. For instance, some fluids are free flowing but others do not flow easily and, in fact, resist flow. The viscosity of the fluidity substances desired to be brought together might be such that the fluid flow would not yield to gravity or even to air presusre. Under these circumstances, machinery designed to operate on principles of gravity or air presusre would be practically useless.

Another factor of concern when considering machines for the mixing of fluidity substances into the desired compound is the thoroughness of the mixing before delivery to the mold. Generally, unless the mixing is proper, the finished product out of the mold will show defects sufficient to cause rejection for market purposes. Defects of this nature also come about as the result of contamination which will occur if the mixing chamber is not completely cleansed or purged in advance of the entrance of a new charge from the substance tanks. This particular handicap is enlarged under circumstances where the viscosity of the fluidity substances is intended to have a relatively high centipoise percentage.

It is, therefore, the primary object of this invention to provide a machine to deliver calculated and mixed fluidity compounds to a mold and one which would be relatively simplified in structure and economically feasible to purchase and operate.

A further object of this invention is to provide a machine which would not only accommodate fluidity substances characterized by free flow but which would also be adaptable and accurately operable in conjunction with fluidity substances characterized by the presence of viscosity in varying degrees.

Still another object of this invention is in the use of a mixing chamber which is thorough in performance and completely purged between charges.

These and other objects will become apparent upon a reading of the following brief specification, considered and interpreted in the light of the accompanying drawings.

Figure 2:
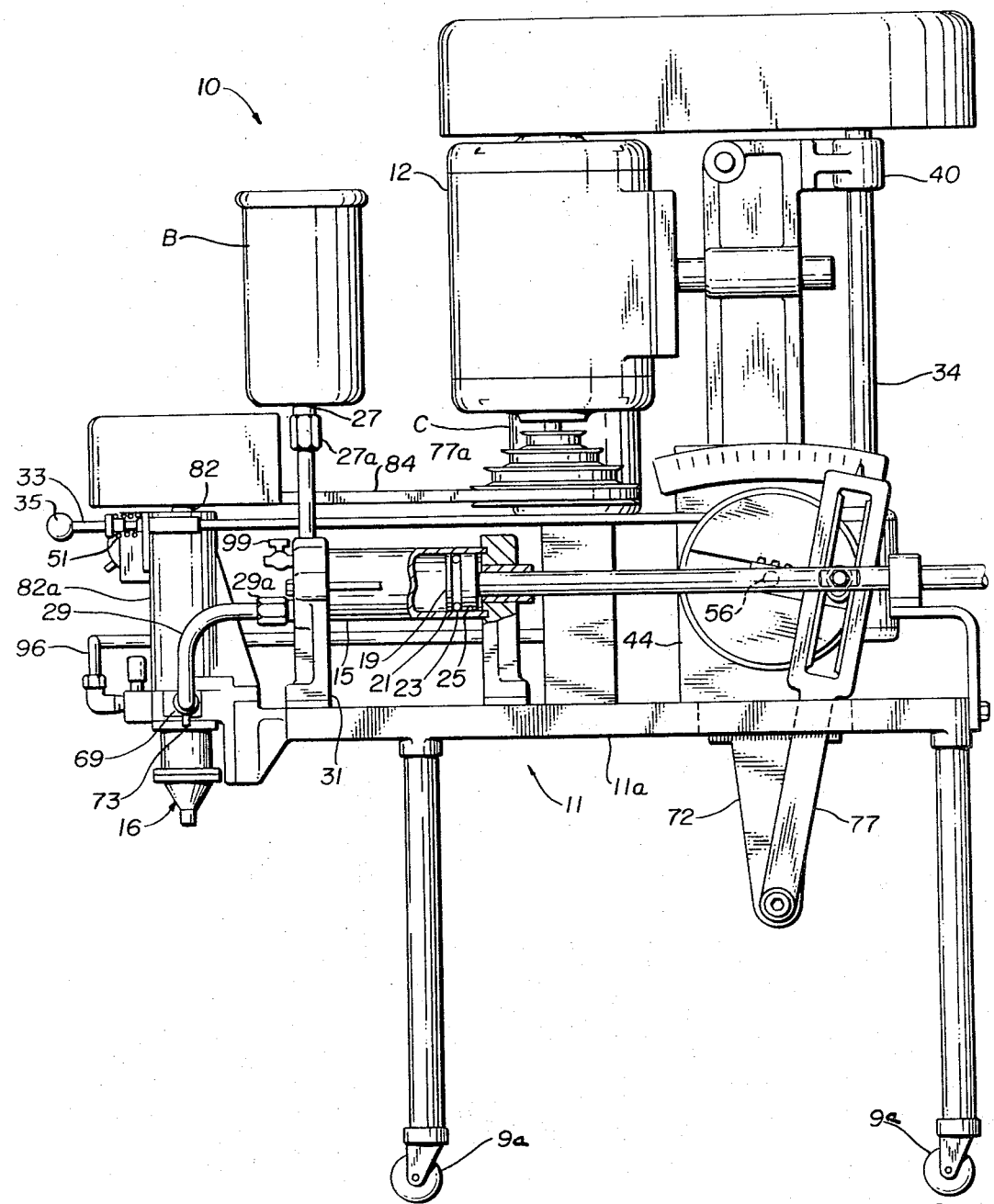
Figure 3:
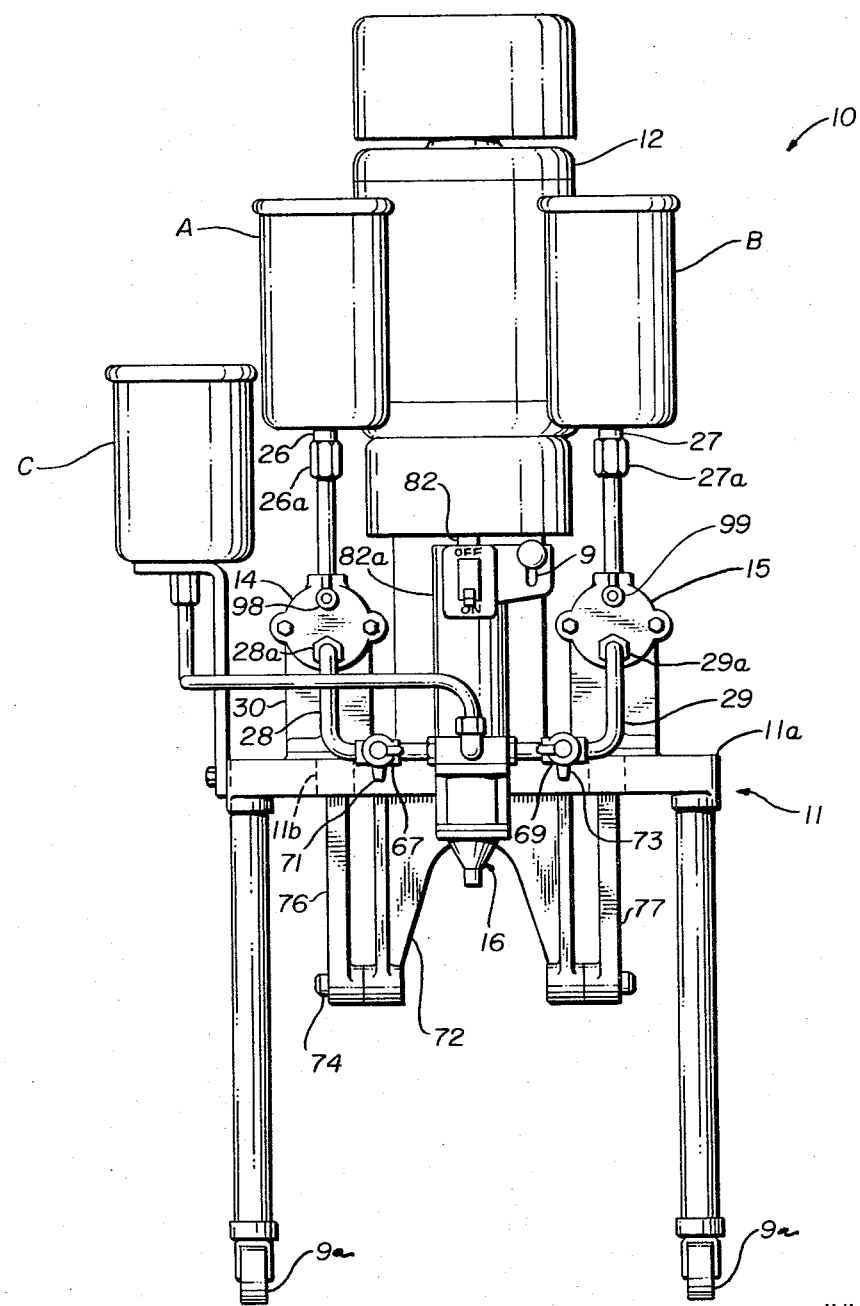
Figure 4:
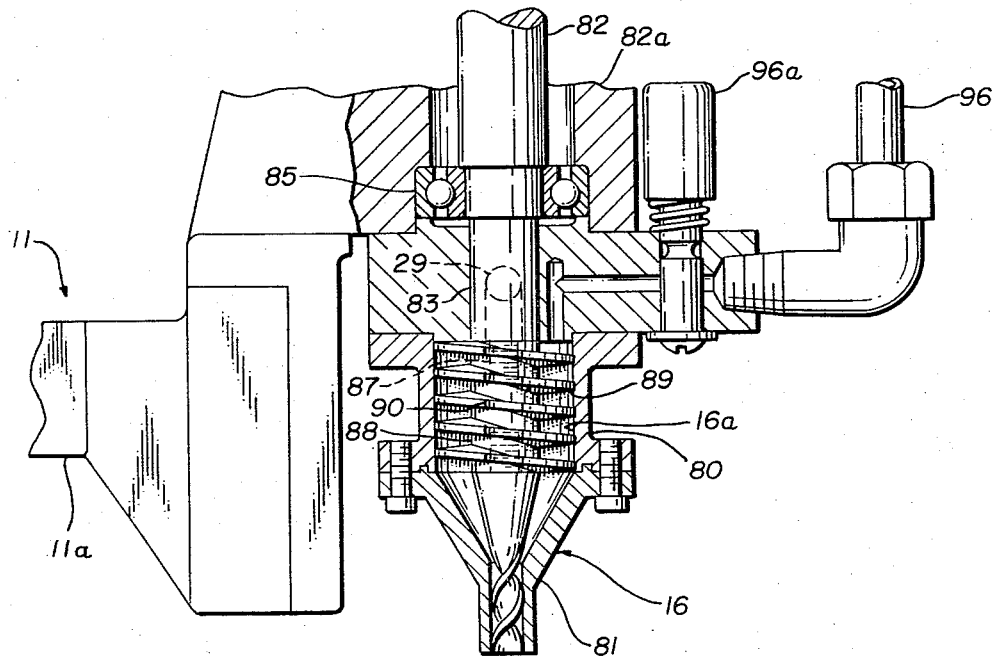
Figure 7:
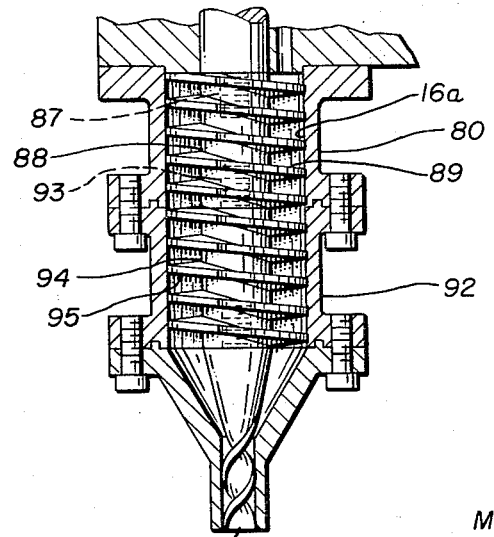
Figure 5:
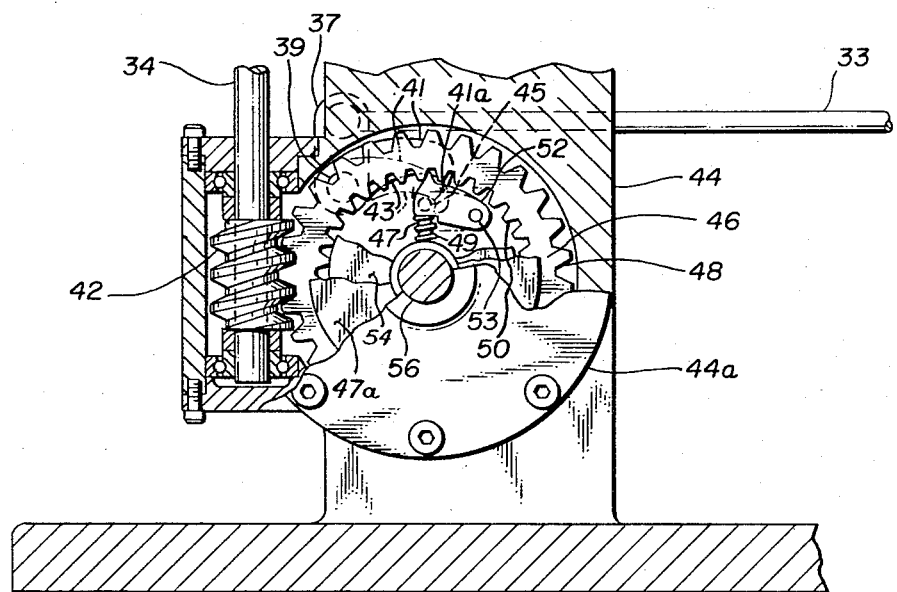
Figure 6:
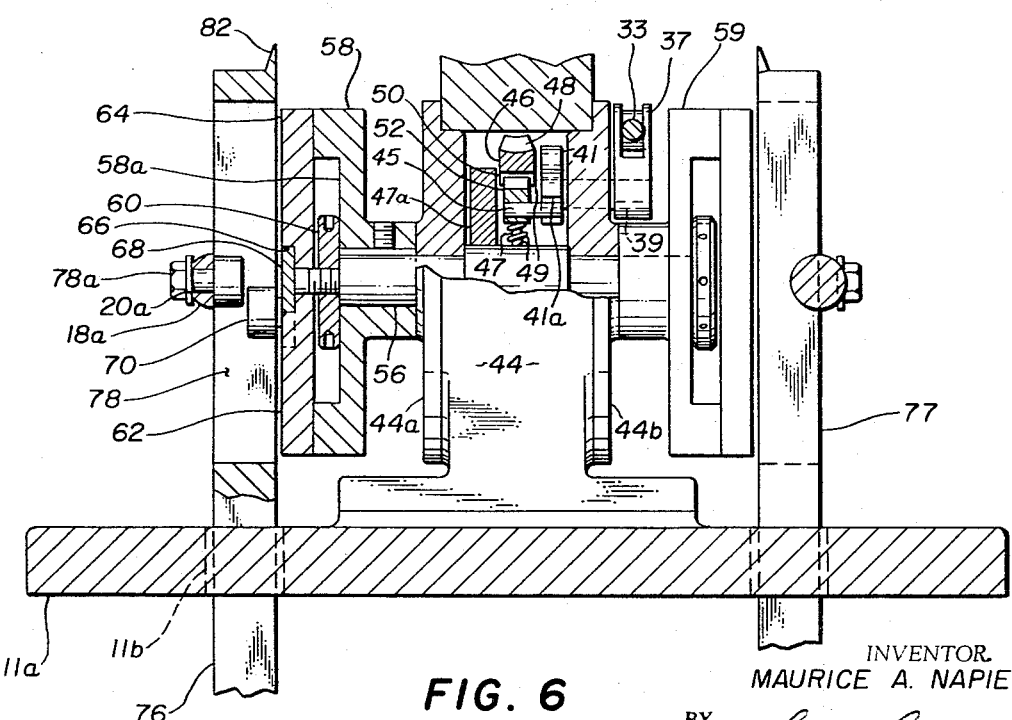

Of the drawings:
FIGURE 1 is a side elevational view, partly in section, of one side of the novel machine.
FIGURE 2 is a side elevational view, partly in section, of the opposite side of the machine.
FIGURE 3 is a front elevational view.
FIGURE 4 is a sectional view of the mixer unit.
FIGURE 5 is a side view of the gear housing box with the side wall partially cut away.
FIGURE 6 is a front elevational view, partially cut away, of the gear housing box and associated structure.
FIGURE 7 is a sectional view showing a modified mixer unit arrangement.

Now, with reference to the drawings, the novel metering and mixing machine, generally designated by the numeral 10 and supported on the standard 11 which may include casters 9a, 9a, is a shown as having fluidity substance tanks A and B, a power unit 12, pumps 14 and 15, and a mixer 16. The arrangement is such that actuation of the pumps 14 and 15 will result in a measured transfer of fluidity substances from the tanks A and B to the mixer 16, as will hereinafter be fully described.

For purposes of reference, pump 14 will be regarded as being on the left hand side of the machine 10. Pump 14 is elongate and cylindrical in configuration so as to house a piston 18 having an operable stroke along a longitudinal axis. The piston head 20 carries a sealing ring 22 to assure an airtight relationship between the piston head 20 and the interior wall 24 of the pump. The intake line 26, preferably tubular, connects between the tank A and the pump 14 to introduce fluidity substances into the pump with the outlet line 28 having a connection in the front wall 30 of pump 14 in providing for the transfer of the fluidity substance from the pump 14 to the mixer 16. Check valve 26a disposed in the intake line 26 will, of course, permit flow from the tank A to the pump 14 during the rearward travel of the piston 18 but preclude flow through line 26 during forward travel. Conversely, check valve 28a in the outlet line 28 will permit flow in the line 28 only on the forward travel of the piston 18.

The structure on the right hand side of machine 10 in relation to the pump 15 is similar to that already described in connection with pump 14. Therefore, pump 15 has related thereto a piston 19, piston head 21, sealing ring 23, interior wall 25, intake line 27, check valve 27a, outlet line 29, check valve 29a, and front wall 31 all of which, it will be understood, are structurally related in the same manner as are the corresponding parts described in connection with pump 14.

The amount of the fluidity substance to be transferred from the tanks A and B to the mixer 16 in a particular one cycle operation is determined by the travel or length of stroke imparted to the pistons 18 and 19, as will hereinafter become evident.

To this end, a drive shaft 34 is connected, by means of a pulley belt 36, to the central shaft 38 of power unit 12 which, in the embodiment illustrated, is an electric motor.

Drive shaft 34 is suitably supported and journalled, as at 40, with its opposite end accommodating a worm gear 42 which is encased within a housing 44. The gear train, within housing 44, is completed by a single gear wheel 46. Wheel 46, retained in proper position by means of keeper plate 47a, comprises an exterior set of gear teeth 48 as well as an interior set 50. Exterior teeth 48 on the gear wheel 46 are in constant engagement to the worm gear 42 on drive shaft 34. A pawl 52 is connected in pivotal relationship, as at 53, to a hub 54 which is rigidly secured to the axle 56. As is made clear in the drawings, axle 56 is transverse, or at right angle, to the direction of drive shaft 34. Therefore, when pawl 52 is engaged to interior teeth 50, the rotation of drive shaft 34 along a vertical axis will result in the rotation of axle 56 in a horizontal axis.

The position of pawl 52 is controlled by a workman through the appropriate manipulation of a clutch lever rod 33 having one end, which may contain a knob 35, forwardly placed for easy access. The rod 33 extends rearwardly with the opposed end connecting to a rocker arm 37. Arm 37 is disposed adjacent to housing 44 so as to have a pin 39 extending through a suitable slot in the wall 44b of housing 44 for rigid connection to the cam 41. Cam 41 has a cam surface 43 for cooperation with the pin 45 laterally protruding from the pawl 52.

Pawl 52 is normally urged into contact with teeth 50 on wheel 46 by a plunger 47 constantly under tension through means of a spring 49 suitably positioned in the hub 54. In order to disengage the pawl 52 from the teeth 50, cam surface 43 is brought into contact with the pin 45 so as to pivot the pawl 52, against the force of plunger 47, out of contact with the teeth 50. When teeth 50 and the pawl 52 are so disengaged, the power of drive shaft 34 will not be transmitted to the axle 56. Consequently, when lever rod 33 is depressed against the force of spring 51, rocker arm 37 will be activated causing the cam 41 to withdraw in such a manner as will allow separation of the cam surface 43 from the pin 45 resulting in the pawl 52, through plunger 47, being urged into engagement with the teeth 50. If lever rod 33 is left free, the spring 51 would tend to return it to its original position resulting in arm 37 moving cam 41 to a position where the cam surface 43 will again contact the pin 45 and pivot pawl 52 out of engagement with teeth 50. Disengagement, under this condition, will occur when axle 56 has made one complete revolution with the hooked end 41a of the cam 41 restraining the pin 45 and, consequently, the hub 54 against any tendency to crawl beyond the desired exact one revolution.

Axle 56 is suitably journalled and provided with bearings in relation to the side walls 44a and 44b of housing 44 as it projects outwardly from the walls to become integral with circular fly wheels 58 and 59. Again, for purposes of reference, fly wheel 58 will be regarded as being on the left hand side of the machine 10. Fly wheel 58 is centrally depressed, as at 58a, to accommodate a movable lock nut 60. Circular plate 62 is bolted to the fly wheel 58 and is provided with a slide surface 64 as well as with a guideway 66 centrally traversing the slide surface 64. Gear rack 68 connected, as by means of a bolt 68a, to the lock nut 60 is slideably engaged in the guideway 66. The gear rack 68 has associated therewith a rigid cam roller 70.

A support bracket 72 extends downwardly from support table 11a and provides, as at 74, a pivotal support for a convertor arm 76. Arm 76 extends upwardly through a suitable elongated slot 11b in the table 11a and, at its opposed end, defines a rectangular-like slideway 78. The cam roller 70 is received within the slideway 78 in slidable relationship thereto. Piston rod 18a is secured, as by means of bolt 78a or other suitable means, to the exterior of the arm 76 and medially of the slideway 78. For this purpose, rod 18a is undercut to provide a flat surface, as at 20a, facilitating the just described arrangement. In this manner, cam roller 70 will rotate in conjunction with rotation of the fly wheel 58 and, through its relationship to the slideway 78, will cause a side-to-side pivoting of convertor arm 76 to thereby preserve the stroke of piston 18 in a true horizontal plane.

The amount of the fluidity substance desired in each complete cycle, as previously mentioned, is determined by the length of piston stroke. For this reason, convertor arm 76 at its extreme upper end carries a fine pointer 82. An indicia scale 84, preferably graduated in centimeters, is positioned on the support standard 11 so as to be adjacent to and cooperative with the pointer 82 in the setting of desired measurements. When the pointer 82 is set to zero reading on the indicia scale 84, cam roller 70 is in exact alignment on a horizontal plane to the axle 56 and at dead center with respect to the slideway 78. Consequently, at zero reading, there will be no movement of the piston 18 since convertor arm 76, to which the piston 18 is secured will remain motionless due to the positioning of cam roller 70 at the center of slideway 78. Of course, any measurement to the right or the left of zero reading will accordingly move cam roller 70 to a variance with the axis of rotation of axle 56 and off center with respect to slideway 78. Rotation of the axle 56 will then cause roller 70 to move "about a circle" in relation to the axis of rotation of axle 56. As a result, convertor arm 76 will be pivoted imparting the desired straight line stroke to the piston 18.

In setting the pointer 82 to a desired and particular reading on the scale, the gear rack 68 is adjusted within the guideway 66 through use of a suitable standard tool, resulting in roller 70 moving convertor arm 76 and, hence, the pointer 82 to its desired scale reading where it may be secured by tightening the rack 68 against the lock nut 60.

On the right hand side of the machine 10, the structure in relationship to the fly wheel 59 is exactly as that described in connection with the fly wheel 58. To repeat the detail would unnecessarily encumber this description and, consequently, it will be understood that the motion of axle 56 through fly wheel 59 and its related structure will cause pivoting of the convertor arm 76 and, hence, the actuation of piston 19 in accordance to a desired measurement, as has been previously explained.

Turning now to the mixer 16, it will be seen that it receives the outlet lines 28 and 29 from pumps 14 and 15, respectively, in such a manner so that the fluidity substances will be emptied into the mixing chamber 16a. Mixer 16 comprises a housing 80, defining the chamber 16a, and a nozzle 81. Mixing of the fluidity substances is accomplished through means of a drive shaft 82 having a reduced diameter portion 83 extending into the mixing chamber, as illustrated. Shaft 82 is driven off the same central shaft 38 of power unit 12 as is the drive shaft 34 but from the opposed end with the power being transferred through pulley belt 84. Further, drive shaft 82 is enclosed within a housing 82a to provide suitable journal supports, as at 85, as will be well known and understood. Reduced diameter portion 83 of shaft 82 terminates in a threaded stud 87. An extension shaft 88 is threaded to the stud 87. Shaft 88 has integral therewith a flange 89 which is spiralling descending in circumferential direction and positioned to be in a sheering relationship to the interior wall 16a of housing 80. Further, flange 89, along its peripheral edge, is cut out at spaced intervals to provide a series of sheer pockets 90, 90.

The mixed fluidity substances, when transferred from the chamber 16a, will enter the nozzle 81 which generally will have a reduced volume capacity. This factor in combination with the effects of centrifugal force would normally tend to cause the mixed fluidity substance to "back up" toward the chamber 16a. To overcome this natural possibility, a reverse screw 91 is threaded into the shaft 88 and acts to constantly force the mixed fluidity substance in proper flow through nozzle 81 into the mold (not shown). This construction assures thoroughness in the mixing of the fluidity substances brought together as well as the forced mechanical purging of the chamber 16a even under circumstances where the viscosity of the pre-mixed and/or mixed substances is relatively high.

If an increased capacity in the mixer 16 is desired, a second housing 92 may be bolted or otherwise secured to the housing 80, as is best shown in FIGURE 7. To this end, shaft 88 has a threaded aperture 93 receiving complemental structure on the shaft 94 disposed interiorly of the housing 92 to assure alignment of the shafts 88 and 94 and the flanges 89 and 95.

The mixer 16, after the machine 10 has been used for a particular purpose, may be cleaned through use of an appropriate cleaning solution. For this purpose, tank C is provided to contain the cleansing solution which may be transferred to the mixer 16 through line 96 by operation of a flow valve, 96a, as desired.

Outlet lines 28 and 29, as is illustrated, have a three-way valve 67 and 69, respectively, to provide a manual control to the flow. One control position will, of course, permit flow into the mixer 16. A second control position will cause flow through the tubes 71 and 73 and bypass the mixer 16. This feature permits samplings to be taken as part of the preparation in setting the machine 10 to a particular task as well as allowing for convenience in priming the pumps, as will become evident.

A further feature of this invention concerns the use of the bleeder valves 98 and 99. The presence of air in some chemical mixtures produces a deleterious effect. For this reason, extraction of air from the mixture is sometimes a prerequisite. It will, therefore, be seen that valve 98, on the left hand side of the machine 10, is disposed on front wall 30 of the pump 14 and has a tube 98a extending rearwardly into the piston 18 to open adjacent the top of interior surface 24. Valve 98 is designed to operate under far less pressure than is check valve 28a and, accordingly, will react to emit air put under slight pressure by the piston 18. When the first solid drop appears through valve 98, it will be known that all air has been extracted from the fluidity substance. The valve 98 may then be closed off to permit the valve 28a to control the emission from the pump 14. It will be understood that valve 99 is identical in structure and purpose in relation to the pump 15.

When using and operating the machine 10, it is assumed that the assembly will be accomplished as shown and described. Further, it is assumed that the two fluidity substances desired to be mixed to obtain a particular product are known. One substance will be placed in the tank A and the other in the tank B. At this point, it is good practice to subject the machine 10 to a testing or pilot run. This procedure, preferably done with the piston stroke set at maximum, permits the adequate priming of the pumps 14 and 15 as well as permitting samplings to be taken. Here, too, it will be suitable to expel the air from the fluidity substances through the valves 98 and 99, if such is desired.

During this procedure, the mixer 16 will be bypassed by manually manipulating the three-way valves 67 and 69 to cause flow through their respective tubes 71 and 73 into any suitable container. When these preliminaries are completed, the samplings may be returned to the tanks from which they originated and the valves 67 and 69 manipulated to preclude flow through the tubes 71 and 73.

On the left hand side of the machine 10, an appropriate standard tool is then used to move the gear rack 68 within guideway 66 until the pointer 82 on convertor arm 76 is aligned to the desired reading on the scale 84. It will be understood that the identical structure on the right hand side of the machine 10, will be manipulated in like manner. If the amounts to be extracted from tanks A and B are equal, the readings on both scales will be identical.

If the ratio of tank A to B is two to one, then the scale reading on scale 82 on the left hand side of the machine 10 will be twice that of the scale on the right hand side. Particular ratios will, of course, be extensively varied. But, in all cases, pumps 14 and 15 will deliver, during each complete rotation of axle 56, the portion of the ratio for which they have been preset with the capability of that portion being zero to one hundred percent.

When the scale readings have been made and the gear racks locked, the machine 10 is ready for operation either manually of automatically, as desired. In manual operation, it is merely necessary to push in on the clutch rod 33 and release. Rocker arm 37 will be actuated causing the cam surface 43 to retract from the pin 45 and resulting in pawl 52 being forced by the spring tensioned plunger 47 into engagement with the teeth 52 on the gear wheel 46. Hub 54 and, consequently, the axle 56 will rotate wtih the gear wheel 46. As rotation continues cam surface 43 will again come into contact with the pin 45, depress it against the force of plunger 47, and disengage the pawl 52 from the teeth 50 on the wheel 46 to thereby stop rotation after one complete rotation of the axle 56.

In automatic operation, the clutch rod 33 is pushed in and retained in that position by means of a latch lock 9. This will, of course, permit the continued separation of the cam surface 43 and the pin 45 allowing the pawl 52 to continue in engagement to the teeth 50 of gear wheel 46. Each revolution of the axle 56 will result in the pumps 14 and 15 delivering their portions of the fluidity substances from respective tanks into the mixer 16. Therefore, there is always one "shot" or "charge" to every one revolution of the axle 56.

As will be understood, the speed of the line conveying the molds (not shown) will be a matter of adjustment to the speed given the axle 56 and, hence, the speed at which each "charge" will be delivered through the mixer 16 and through the nozzle 81 to the molds. The speed is variable and, in the embodiment shown, the step pulley wheels 75, 77, 77a, and 79 on the shafts 34, 38, and 82 permit speed variation. Other methods of imparting speed variation as, for instance, a variable speed electric motor, will be obvious to those skilled in the art.

High speed is a capability of the embodiment shown. This feature is in recognition of the fact that some fluidity substances when brought together or exposed to air react quickly, sometimes in the time space of a few seconds, to a changed state, usually hardening. If this reaction does not come natural, it might be thought advisable to bring it about by the appropriate use of catalysts or accelerators.

The machine 10 as herein described is known in the art as a two component machine. It, therefore, will be readily apparent that two machines 10 may be placed side-by-side and four tanks emptied through one mixer. This set-up would then be known as four component machine. Of course, more than two machines may be so used to result in a six or more component machine. These component variations are further diversified when it is remembered that any one of the pumps making up the components may be deactivated by setting measurement structure to achieve a zero reading on its related scale.

There has been shown, then, a metering and mixing machine which has been structurally simplified and of such compact size as would permit it to be portable, if so desired. The power drive and the gear train combines an uncomplication of parts to reduce both the original and maintenance costs. The flow of the fluidity substances is controlled and forced by purely mechanical means with the stroke of the pistons in the pumps being, at all times, regulated to deliver all, no more or less, of the particular fluidity substance portions desired. There is, therefore, no dependence on free flow. The total mechanical control in measurement, pumping, and mixing permits the machine to measure, pump, and mix fluidity substances relatively high in viscosity. The mixer is mechanically self-cleaning during operation, a feature which drastically reduces rejection of finished products due to contamination.

What is claimed is:

1. A metering and mixing machine of the character described, comprising; a plurality of fluidity substance tanks; a similar plurality of pumps disposed so that one pump is in association to one tank; a single mixer unit; intake lines cooperating between said tanks and said pumps; outlet lines leading from said pumps to empty into said mixer unit; each said pump including a piston; a driven shaft having a gear at one terminal end; an axle with a second gear associated therewith; means for transferring power from said driven shaft through said gear and said second gear actuating each said piston in a mechanically forced linear stroke; the actuation of each said piston forcing the measured flow of fluidity substance from its associated tank to said mixer unit.

2. The device of claim 1 wherein said means includes a pawl carried by a hub rigidly secured to said axle; and said axle is rotated when said pawl is engaged to said second gear.

3. The device of claim 2 wherein there are spaced circular slide surfaces secured to said axle; a cam roller centrally disposed in relationship to each said slide surface; and a converter arm, having an indicia pointer, is secured to each said piston and slidably engaged to each said cam roller.

4. The device of claim 3 wherein each said cam roller is in shiftable relationship to the axis of rotation of said axle imparting a controlled variation in the distance of travel of each said piston.

5. A metering and mixing machine of the character described, comprising: a single mixer unit; a pair of fluidity substance tanks; a pair of pumps, one for each said tank; a pair of pistons, one in each said pump; a pair of cam rollers, one engaging each said piston; a pair of convertor arms, one engaging each said cam roller; a pair of circular slide surfaces, one supporting each said cam roller; an axle carrying a rigidly secured hub and having its terminal ends defined by said slide surfaces; a pawl on said hub; a bitoothed gear wheel; a driven shaft having one end terminating in a worm gear constantly engaged to the exterior gear set on said bitoothed gear; said pawl movable into and out of engagement with the interior set on said bitoothed gear; a clutch mechanism controlling the movement of said pawl; and when said pawl is moved to engage said interior gear set power will be transferred from said driven shaft through said axle actuating said pair of pistons forcing fluidity substance to flow from said pair of fluidity substance tanks into said mixer unit.

6. A mixer unit for use on a metering and mixing machine, comprising; a housing defining an interior chamber; a nozzle; a central shaft; a flange integral with said shaft and disposed in sheering relationship to the interior wall of said housing; spaced sheer pockets on said flange, said flange being spirally descending in circumferential direction forcing flow into said nozzle; and a flow forcing reverse screw disposed in said nozzle.

7. The device of claim 6 wherein a second housing having complemental structure is secured to said first mentioned housing.

References Cited by the Examiner

UNITED STATES PATENTS

| | | | |
|---|---|---|---|
| 1,964,028 | 6/1934 | Boynton et al. | 222—26 |
| 2,895,644 | 7/1959 | Pande | 222—134 |
| 2,974,830 | 3/1961 | Hood | 259—7 |
| 3,008,808 | 11/1961 | Hodges | 259—8 |
| 3,023,455 | 3/1962 | Geier et al. | 259—9 |

WALTER A. SCHEEL, *Primary Examiner.*

R. W. JENKINS, *Assistant Examiner.*